United States Patent
Salvi et al.

(10) Patent No.: US 10,019,241 B2
(45) Date of Patent: Jul. 10, 2018

(54) EXTENDABLE FRAMEWORK FOR DEVELOPING APPLICATIONS

(71) Applicant: SAP SE, Walldorf (DE)

(72) Inventors: Abhijit Salvi, Cupertino, CA (US); Alexander Chernavin, Belmont, CA (US); Kevin Tully, San Mateo, CA (US)

(73) Assignee: SUCCESSFACTORS, INC., South San Francisco, CA (US)

( * ) Notice: Subject to any disclaimer, the term of this patent is extended or adjusted under 35 U.S.C. 154(b) by 0 days.

(21) Appl. No.: 15/158,394

(22) Filed: May 18, 2016

(65) Prior Publication Data

US 2017/0337040 A1    Nov. 23, 2017

(51) Int. Cl.
| | |
|---|---|
| G06F 9/44 | (2018.01) |
| G06F 8/34 | (2018.01) |
| G06F 3/0484 | (2013.01) |
| G06F 8/20 | (2018.01) |
| G06F 8/30 | (2018.01) |
| G06F 17/30 | (2006.01) |

(52) U.S. Cl.
CPC .............. *G06F 8/34* (2013.01); *G06F 3/0484* (2013.01); *G06F 8/20* (2013.01); *G06F 8/24* (2013.01); *G06F 8/30* (2013.01); *G06F 17/30292* (2013.01)

(58) Field of Classification Search
None
See application file for complete search history.

(56) References Cited

U.S. PATENT DOCUMENTS 8,621,432 B2 * 12/2013 Morris ............... G06F 8/34
  717/104
2016/0196117 A1 * 7/2016 Cunniffe ............ G06F 8/34
  717/109

* cited by examiner

*Primary Examiner* — Lewis A Bullock, Jr.
*Assistant Examiner* — Mark A Gooray
(74) *Attorney, Agent, or Firm* — Fountainhead Law Group P.C.

(57) ABSTRACT

The embodiments described in this disclosure relate to an extendable data model framework that enables users to develop applications without having to write code. The embodiments provide a user interface for users to build and maintain applications based on the framework, create custom user interfaces for the application, as well as define data objects, relationships between objects, workflows, business logic, and rules for applications the users are developing. The extendable data model framework includes an extendable data objects data structure and an extendable data object relationships data structure for users to customize data objects and relationships of the data objects for their applications using the described system. These data structures may include common data objects and relationship elements. The data structures can facilitate extension of data objects of the application as well as definition of new objects to be customized based on the business requirements of users.

17 Claims, 13 Drawing Sheets

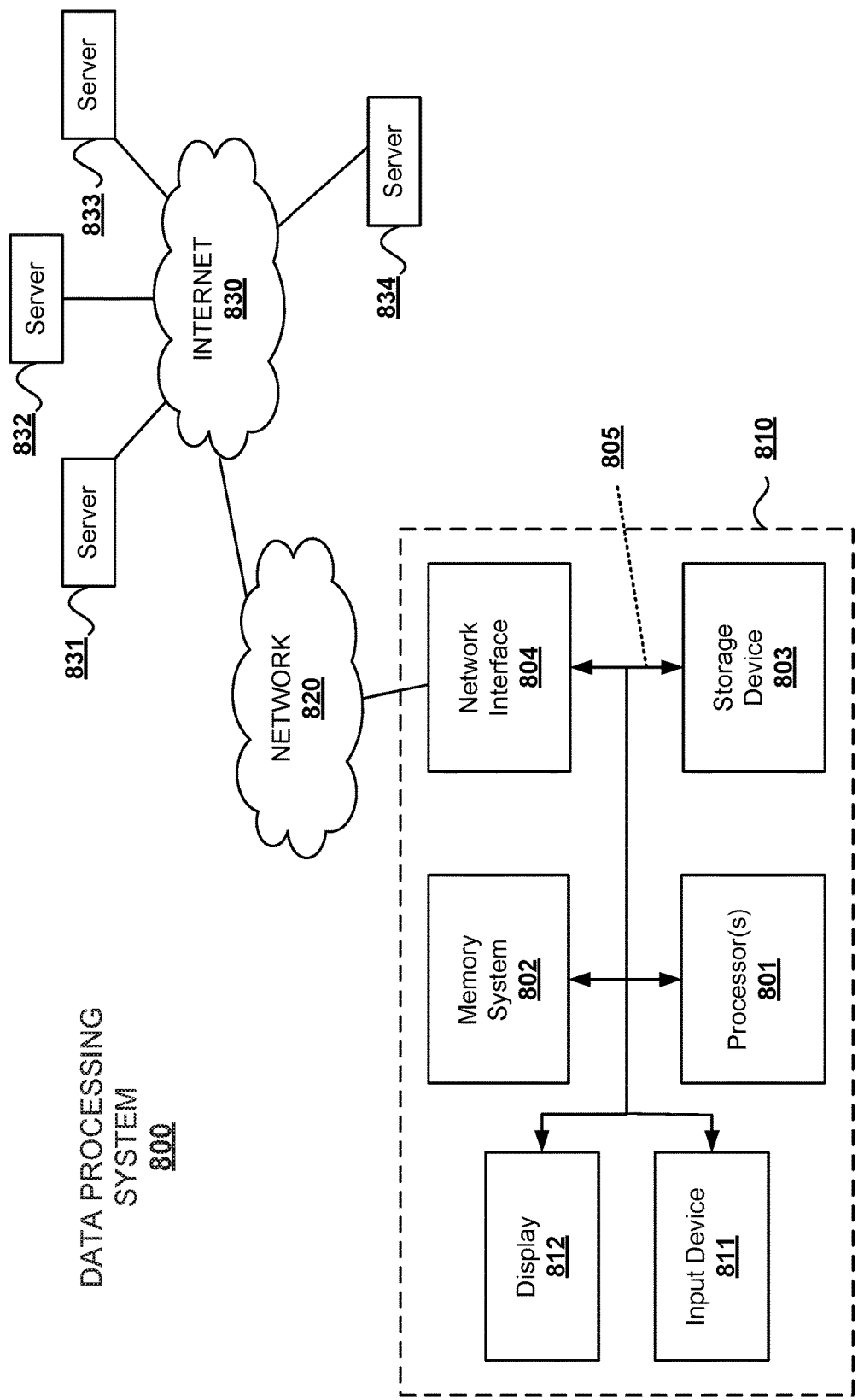

EXTENDABLE FRAMEWORK FOR DEVELOPING APPLICATIONS

TECHNICAL FIELD

At least certain embodiments in this disclosure relate to providing an extendable data model framework for users to develop applications in a graphical interface.

BACKGROUND

Conventionally, software applications are developed by experienced software programmers or other individuals with IT backgrounds. This process can be cumbersome and require a large amount of time and team effort, as well as may require multiple iterations and troubleshooting to achieve the finished product. In addition, every customer is unique with their own unique business processes, policies, validations. Moreover, many customers may want to distinguish themselves from their competitors by providing enhanced solutions and systems. For example customers may want to provide their employees with enhanced software solutions, so that they can be more productive and can do a job better. In certain industries, this may be crucial for attracting and retaining top talent.

But customer requirements are always changing. It is therefore impossible to deliver application solutions that will satisfy each and every requirement of such a diverse set of customers with a single out-of-the-box solution. Accordingly pre-configured solutions can be a constraint that prevents customers from implementing their processes or policies which are important for their businesses.

Extensibility and adaptability of existing solutions is therefore important to assist businesses in extending the functionality of their applications to better align with their business processes, policies, and validations.

SUMMARY

The embodiments described in this disclosure include improved methods, systems and computer readable media for users to develop applications in a user interface based on an extendable data model framework.

The following detailed description and accompanying drawings provide a better understanding of the nature and advantages of the techniques described in this disclosure.

BRIEF DESCRIPTION OF THE DRAWINGS

For a better understanding of at least certain embodiments, reference will be made to the following detailed description, which is to be read in conjunction with the accompanying drawings.

FIG. 8 depicts an example overview block diagram of a data processing system upon which the embodiments described in this disclosure may be implemented.

DETAILED DESCRIPTION

Figure 1:
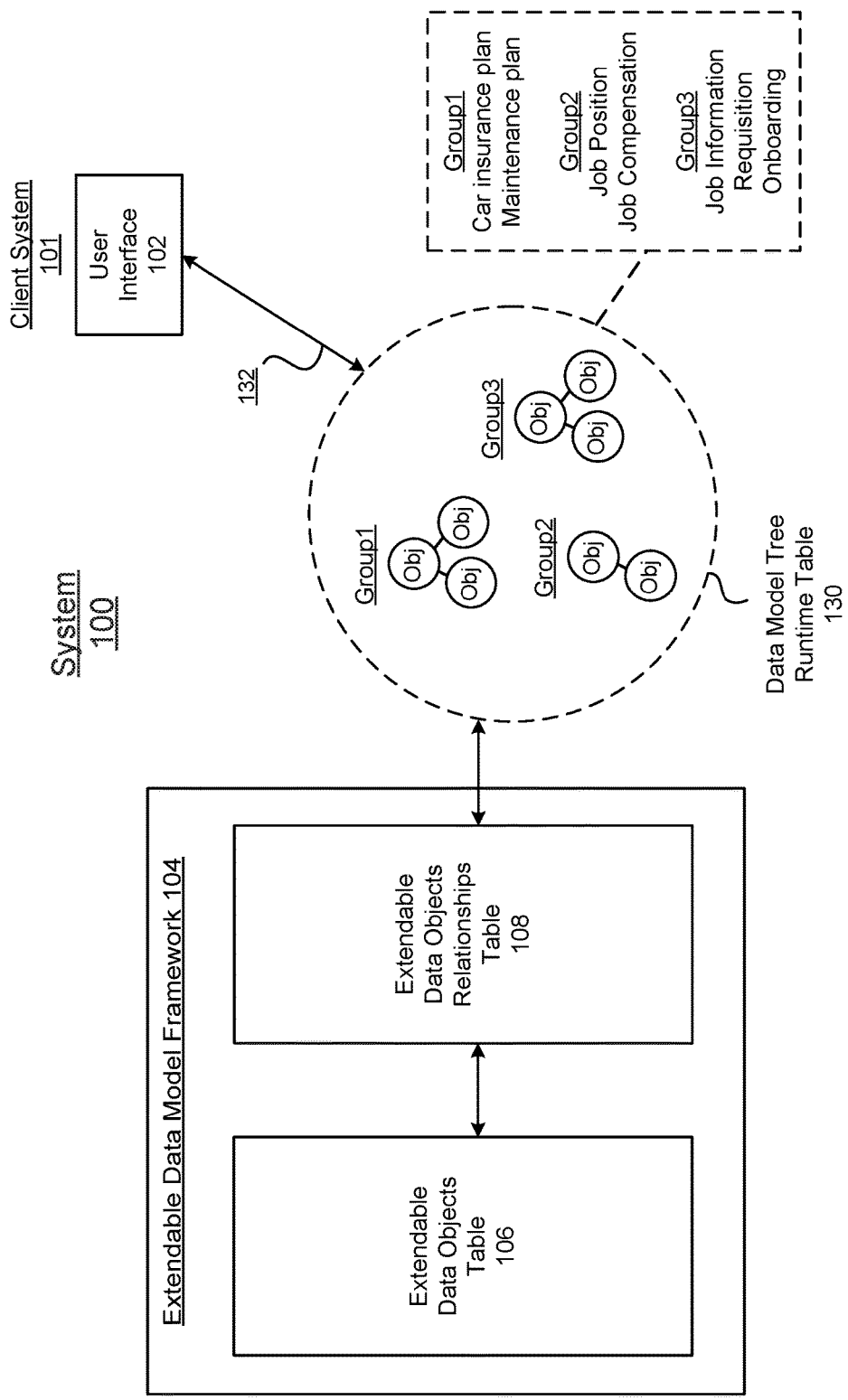
FIG. 1 depicts a conceptual block diagram of an example embodiment of a system for developing applications based on an extendable data model framework in accordance with the techniques described in this disclosure.

Throughout the description, for the purposes of explanation, numerous specific details are set forth in order to provide a thorough understanding of this disclosure. It will be apparent to one skilled in the art, however, that the techniques described in this disclosure may be practiced without some of these specific details. In other instances, well-known structures and devices may be shown in block diagram form to avoid obscuring the principles and techniques described in this disclosure.

The embodiments described in this disclosure include improved methods, systems and computer readable media for users to develop or modify software applications in a user interface at a client system based on an extendable data model framework that provides tools and extendable data structures for building applications. In one embodiment, these applications may be referred to as extension applications because they are built as extensions on top of an extendable data model framework. For example, users can create and manage end-to-end extension applications such as, for example, applications for Tuition Reimbursement, Pension Plans, Asset Management, Company Car Management, Payment Guidelines etc. All these extension applications can be developed by users based on the tools and extendable data structures provided in the framework.

The extendable data structures enable users to generate or modify applications via a user interface. In response, a backend server system can be configured to update the extendable data structures and data objects stored in the extendable data structures based on the user inputs. In one embodiment, the extendable data model framework may include an extendable data objects data structure (e.g. database table) and an extendable data objects relationship data structure (e.g., database table) provided to users to define, modify, and customize objects for the application and relationships between the application objects.

Embodiments provide an extendable data model framework and a user interface that allow users to create or modify data models for applications, create new fields, business logic, business validations, as well as creating and/or modifying the user interface itself. That is, the user interface can be provided to a client system to facilitate ease of development of the application and for development of the user interface of the application. The extendable data model framework, in at least certain embodiments, provides a configurable solution that facilitates customization and consistency that enables users to create their own custom entities that can be automatically propagated into the user interface. For example, the extendable data model framework and associated user interface provides consistent data models, a consistent set of business objects and validations, consistent user interface look and feel, and consistent controls, workflows, etc., but for customized applications.

Users can create data objects of an application in the user interface, set fields and values within those fields, define relationships to other objects, etc. For example, in a company car application, users can identify the company car for a particular employee, the year, make, and model of the company car, as well as the car's insurance plan, accident history of the employee, etc. The extendable data model framework also enables defining customizable business logic such as defining policies relating to the company car. For example, the customizable business logic can be used for defining how many years an individual must be employed within the company to be assigned a company car, defining what positions within the company are allowed a company car, policies for when the company car must be services, defining how many accidents or violations an individual is allowed before losing privileges to a company car, and determining manager approval for the company car, etc.

Users can develop applications by building upon the extendable data model framework using options provided in the user interface without ever having to write a single line of code. Users can create custom objects, define object attributes, and define relationships between objects, etc. In addition, users can connect together objects with a user-configurable workflow, a user-configurable set of rules or policies, and a user interface adapted to present users with a visual display of the objects and relationships for the application. Users can also define how the user interface itself looks to the end user. For example, users can define icons, fields, and parameters, etc., for the applications they are developing.

In the backend of the system, the data model for the application is being modified and the supporting tables are being built within the extendable data model framework. The data models are stored as part of the extendable data model framework in memory of the backend system. Users can modify objects, relationships between objects, and reference existing objects, primitive types, and definitions, etc. The backend system can handle the necessary structured query language ("SQL") changes and generate queries (e.g., on the fly) to make the appropriate changes to the data structures for the application. If, for example, a user queries a car object for a company car application that has been developed based on the extendable data model framework, the system can access the data model for the car, query a database for data objects of the car data model, and automatically know what the car data model is, and how is it related to other objects. Then the system can build or update the appropriate queries to modify the data model of the company car application. It should be noted that query languages other than SQL are possible. The embodiments are not limited to any particular query language.

In addition, rules or policies can be associated with the underlying data structures. For example, a user may specify a rule based on a mileage check for a company car application that is built based on the extendable data model framework. This may include creating custom entities, custom business rules and logic, as well as creating custom user interfaces for the applications. For example, a user may specify a rule based on a mileage check configured to occur at certain intervals or upon the occurrence of an event. For example, a user may specify a mileage check every time the company car is due for service. Every time the company car comes up for service, the rule can get triggered. The work can be done by a backend server(s) that is configured to manage the data structures for data models of the applications that have been build using the extendable data model framework. This can significantly reduce application development time. The described embodiments can also provide an intuitive and easy to use graphical user interface for non-IT users, such as a human resources administrator or analyst, to develop extension applications.

I. Exemplary Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

FIG. 1 depicts a conceptual block diagram of an example embodiment of a system for developing applications based on an extendable data model framework in accordance with the techniques described in this disclosure. In the illustrated embodiment of system 100, users of the client system 101 are provided with a user interface 102 that can be used to build and update one or more custom applications as part of the extendable data model framework 104. The client system 101 can provide the user interface 102 for users to graphically develop their applications. In one embodiment, users can develop applications within the user interface 102 based on the extendable data model framework 104 without ever having to write a single line of code for the application. The extendable data model framework 104 may include an extendable data objects table 106 and an extendable data object relationships table 108. In one embodiment, users can define new data objects for applications or modify existing data objects by adding or removing data object attributes by adding or removing attributes. The extendable data objects table 106 may provide common data objects that have been pre-configured and provided to users and the extendable data objects relationship table 108 may define relationships between the data objects.

The extendable data objects table 106 and the extendable data objects relationship table 108 may include additional empty rows and columns for users to customize their applications built on the extendable data model framework 104. For example, the extendable data objects table 106 and the extendable data objects relationship table 108 may include additional empty rows that can be used for defining new application objects and relationships, as well additional empty columns for users to customize data objects by defining new attributes for the data objects. Users can develop and/or modify extension applications built upon the extendable data model framework 104 based on modifying the objects stored in the extendable data objects table 106 and based on modifying the relationships between the objects of the application stored in the extendable data objects relationships table 108. For example, users may modify the objects of an application or the relationships between the objects of the application by adding additional attributes, modifying existing attributes, or by removing attributes from the objects of the application.

In addition, the extendable data objects table 106 may be pre-configured with a plurality of common data objects for developing applications based on the extendable data model framework 104. In particular, the extendable data objects table 106 can include a first set of columns for storing attributes associated with the set of common data objects and a second set of empty columns for users to supply additional attributes to the common data objects for the application. Similarly, the extendable data objects relationship table 108 may comprise a first set of columns that define relationships between the common data objects of the application and a second set of columns for users to supply additional relationships between objects of the application.

As shown in the depicted embodiment, during runtime a data model tree runtime table (or other data structure) 130 can be generated. The data model tree runtime table 130 can represent various different relationships between the objects of the application. As shown, the objects of the invention may be grouped into relationships such as group1, group2 and group3. Group1 may be associated with a company car application built upon the extendable data model framework 104, group2 may be associated with an internal promotion application, and group3 may be associated with a recruiting application. In the depicted example, group 1 comprises two data objects for the application, including a car insurance plan and a maintenance plan, group2 comprises two objects for the application, including job position and job compensation, and group3 comprises three objects for the application, including job information, requisition, and on boarding objects, and so on.

During runtime, system 100 can generate the data model tree runtime table 130 to represent the structure of the data model of the application based on the information stored in the extendable data objects table 106 and the extendable data objects relationships table 108. In one embodiment, the system 100 can then dynamically generate queries in the backend system to perform the operations selected by the user on the objects of the application stored in the extendable data objects table 106 or on the relationships between the objects stored in the extendable data objects relationships table 108. For example, the operations to be performed on the data objects and relationships may include one or more well-known data access operations including, for example, INSERT, SELECT, UPDATE, and DELETE operations (collectively "ISUD" operations).

In at least certain embodiments, the extendable data objects table 106 and the extendable data objects relationships table 108 may be implemented in the memory of the database server as "in-memory" data structures. As is well known in the art, in-memory database systems ("IMDBs"), also referred to as a main memory database system ("MMDBs"), are database management systems that primarily rely on main memory for data storage. Main memory database systems are generally faster than disk-based database systems because the internal optimization algorithms can be simpler and can execute in fewer CPU cycles. In addition, accessing data in memory eliminates the time necessary for querying data from disk, which provides faster and more predictable performance than disk-based operations.

The extensibility of the techniques described in this disclosure may be based on the generic and extensible nature of the extendable data model framework 104. The data objects and relationships can be persisted in data storage (e.g., a database), while the structure of those objects and relationships (as well as the rules and validations relating to those objects and relationships) can be persisted in memory, for example, using in-memory data structures. For applications where response time is critical, in-memory database systems are often preferred. When querying an in-memory database system, it is not necessary to query the database—the data structure stored in memory can instead be queried. Other embodiments, however, are not limited to in-memory database systems or data structures.

Figure 2:
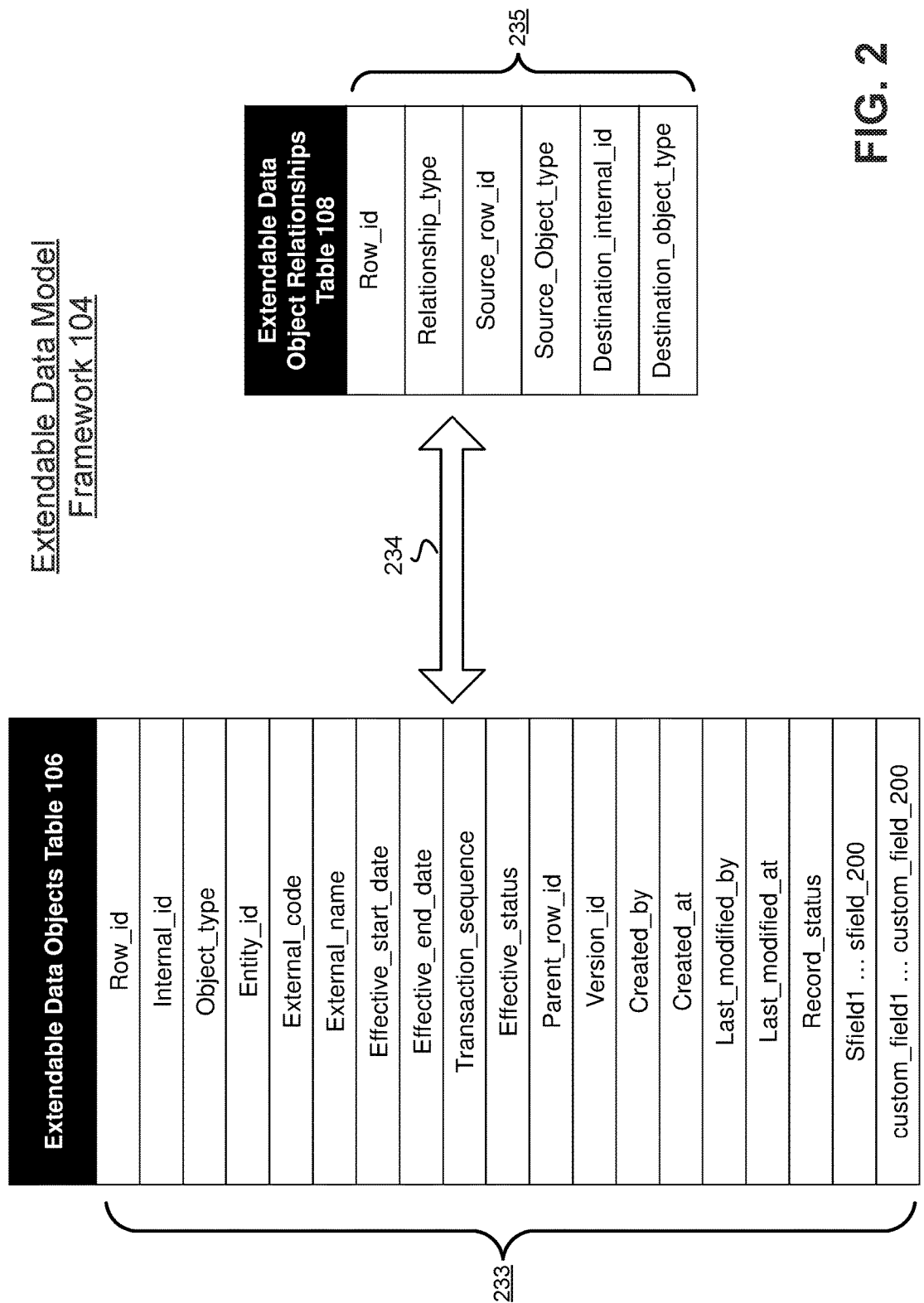
FIG. 2 depicts a conceptual block diagram of an example embodiment of an extendable data model framework in accordance with the techniques described in this disclosure.

FIG. 2 depicts a conceptual block diagram of an example embodiment of an extendable data model framework in accordance with the techniques described in this disclosure. In the illustrated embodiment, the extendable data model framework 104 includes an extendable data objects table 106 in communication with an extendable data objects relationships table 108 via one or more networks or communication mediums 234. The extendable data objects table 106 comprises a plurality of fields 233, including row ID, internal ID, object type, entity ID, external code, external name, effective start date, effective in date, etc., and the extendable data object relationships table 108 comprises a plurality of fields 235, including row ID, relationship type, source row ID, source object type, destination internal ID, and destination object type, etc.

A non-exhaustive list of available data types for the extendable data objects table 106 includes:

1. String (maximum length may be limited by 4000 characters length);
2. Number (integer number);
3. Auto-number (automatically generated unique number, can be used as an identifier);
4. Decimal (floating point number);
5. Boolean (e.g., true/false);
6. Date (holds information about date only, not time);
7. Date Time (holds information about date and time);
8. Time (time of a day only, no information about date);
9. Picklist (a reference to Picklist object, for example a dictionary of key-value pairs);
10. Translatable (stores string information for locales (e.g., US and Germany) on a customer instance: "company car" is for a U.S. locale and "Firmenwagen" is for a German locale);
11. Data Source (from data model point of view, it's a string field. However, from a user interface point of view, values for this field can be selected from a drop down menu, where a list of allowed values for the drop down can be specified by pre-defined logic, e.g., it can be a list of all data model object codes, or a list of available permission categories, etc.);

12. "Enum" (this field allows users to select a value of a pre-defined Enum, e.g., status active or inactive);
13. Generic Object (a reference to an object of the framework);
14. Foundation Object (a reference to legacy objects);
15. Attachment (a file attachment);
16. User (a reference to a user); and
17. a CLOB (string field, allows storing information in a format that has more than 4000 characters).

Figure 3:
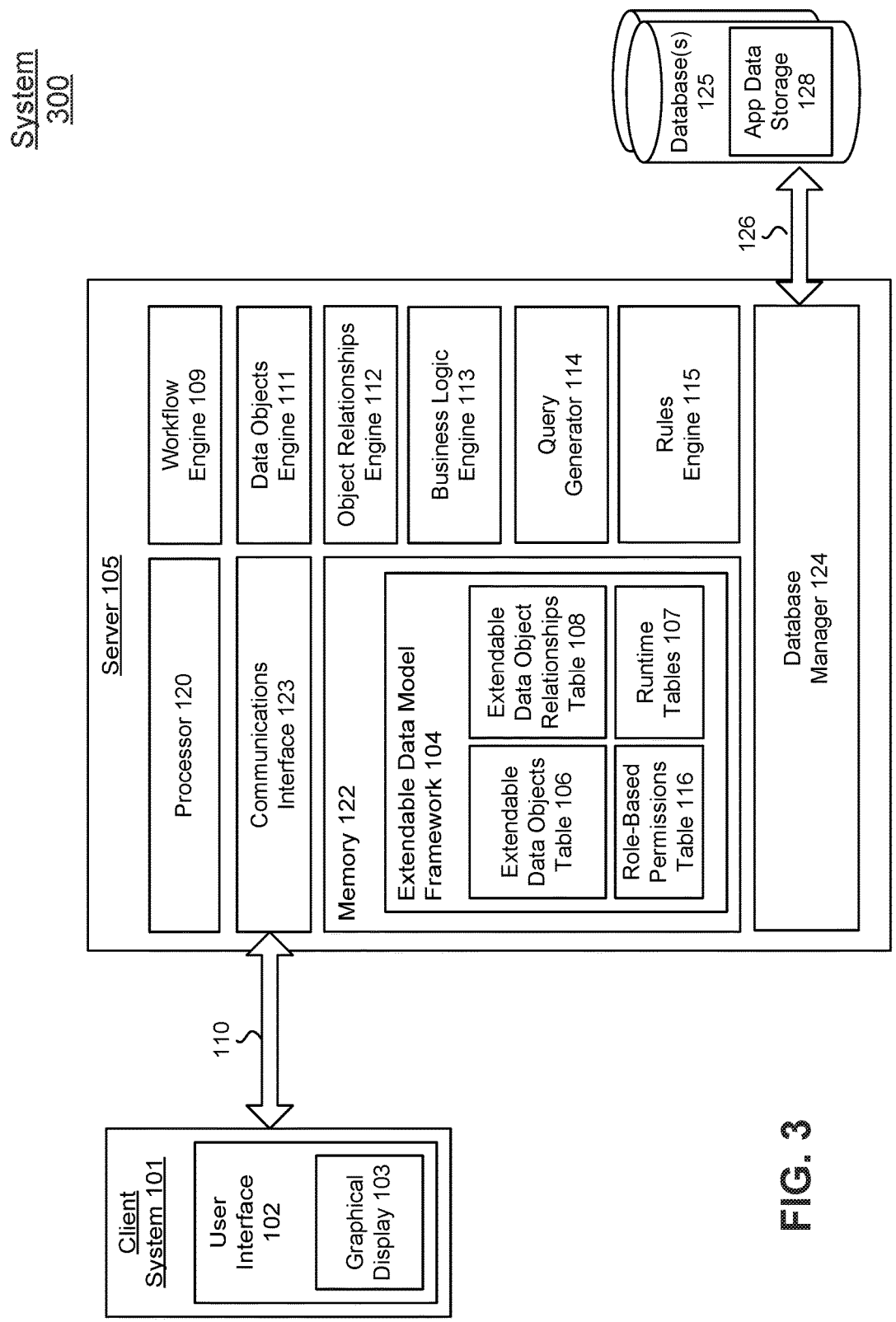
FIG. 3 depicts a conceptual block diagram of an example embodiment of a system for developing applications based on an extendable data model framework in accordance with the techniques described in this disclosure.

FIG. 3 depicts a conceptual block diagram of an example embodiment of a system for developing applications based on an extendable data model framework in accordance with the techniques described in this disclosure. In the illustrated embodiment, system 300 includes a client system 101 in communication with a server computer 105 via one or more communication networks or mediums 110. The client system 101 includes a user interface 102 having a graphical display 103. Users can remotely develop applications in the graphical display 103 of the user interface 102 at the client system 101.

In the depicted embodiment, the server 105 includes a processor 120, a memory 122, a communications interface 123, and a database manager 124. One or more client computer systems 101 are in communication with the server 105 over one or more communications networks 110. The client system 101 may be configured to communicate with the server 105 over the one or more networks 110 via the communications interface 123 in order to perform data access operations relating to applications, such as, for example, ISUD operations. The server 105 can be configured to perform data accesses operations on application data 128 stored in the one or more database(s) 125. The server 105 may be implemented as an individual computer hardware server or as an array of computer hardware servers logically coupled together and working in a functionally coordinated manner. Generally, a server comprises a system configured to perform data access operations with respect to data stored in one or more repositories of data (e.g., database(s) 125). Depending on the type of database server, data operations may range from simple operations, such as storing and retrieving data, to more complex operations such as calculating statistics based on the data, or arranging, modifying, or formatting data.

As shown in FIG. 3, the server 105 is in communication with one or more databases 125 adapted to store data. In one embodiment, the server 105 may be in remote communication with the databases 125 via one or more communication links or networks 126. Alternatively, database 125 may be a component of the database server 105 and configured to communicate with the server 105 via a direct or indirect connection or network 126. The database(s) 125 may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

The database manager 124 may be configured as a general-purpose database management system ("DBMS") that communicates with the one or more databases 125 for the purposes of storing and retrieving data to or from the databases 125. A DBMS may be configured as a computer software application that interacts with the database 125 and other applications or users to capture and analyze data. For example, a DBMS may be designed to allow for definition, creation, querying, update, and administration of databases 125. The database manager 124 may comprise an integrated set of computer hardware and software programs that allow client systems 101 to interact with the databases 125 to provide access to data. In addition, the database manager 124 may provide various functions that allow entry, storage, and retrieval of large quantities of information, and provide a mechanism to manage how the information is organized in the databases 125.

The server 105 also includes memory 122 in communication with the one or more processors 120. The memory 122 may be configured to store information and instructions to be executed by the one or more processors 120 for performing the techniques described in this disclosure. The memory 122 may be a single component of memory or may include multiple memory components of different types, including random access memory ("RAM"), read only memory ("ROM"), flash memory, cache memory, memory buffers, and/or disk-based memory, or combination thereof, etc. The memory 122 may also comprise a disk-based storage device, such as a hard disk, for storing information and programs. Common forms of such storage devices include nonvolatile memory, for example, a hard drive, a magnetic disk, an optical disk, a CD-ROM, a DVD, a flash memory or other non-volatile memory, a universal serial bus ("USB") memory card, or any other computer-readable medium from which a computer can read computer data and instructions.

In system 300, memory 122 is depicted as storing the extendable data model framework 104. The extendable data model framework 104 includes the extendable data objects table 106, the extendable data object relationships table 108, a set of runtime tables 107, and a role-based permissions table 116. In one embodiment, the extendable data model framework 104 stored the object data for the applications in the extendable data objects table 106 with several utility tables complementing it (indexing entity relationships, storing blobs, auditing, workflow, etc.). The extendable data object relationships table 108 may be used to index associations between entities stored in table 106 so that a query can be built to select related entities in a single operation. As discussed above, during runtime a data model tree or other runtime tables or data structures 107 can be generated. The data model tree runtime table 107 can represent various different relationships between the objects of the application.

In the depicted embodiment, the server 105 of system 300 further includes a workflow engine 109, a data objects engine 111, an object relationships engine 112, a business logic engine 113, a query generator 114, and a rules engine 115. The workflows for the applications developed by users at the user interface 102 may be implemented and managed by the workflow engine 109. The user interface 102 may include a workflow creation page for this purpose. Data objects for applications developed by users at the user interface 102 may be defined and maintained via the data objects engine 111. The user interface 102 may include an object creation page for this purpose. Relationships between data objects for applications developed at the user interface 102 may be defined and maintained via the object relationships engine 112. The user interface 102 may include an object relationships creation page for this purpose. In addition, the user interface 102 itself can be created and maintained by users via the graphical interface 103 using a user interface creation page. Rules for the application objects and relationships may be defined and maintained using the rules engine 115. The rules engine 115 may access the role-based permissions table 116 to determine roles of users of the system when rules are defined and managed.

When a user creates a new application or modifies an existing application, the structure of those changes is stored in the extendable data objects table 106 and the extendable data objects relationships table 108. In response to user input at the user interface 102, the query generator 114 may generate queries to the extendable data model framework 104 stored in memory 122. In other embodiments, the query generator 114 can also query the database 125 for some or all of this information. In one embodiment, the queries may be generated by the query generator 114 dynamically when user input is received at the user interface 102 and provided to the server computer 105. In one embodiment, the server 105 can store and maintain the structure of the applications developed using the extendable data model framework 104.

As will be appreciated by persons of skill in the art, the network(s) 110 may be implemented as a single wired or wireless network, or multiple separate networks in communication with one another. Network(s) 110 may be implemented as any wired or wireless network(s). For example, the networks 110 described in this disclosure can be implemented as a local area network ("LAN"), wide-area network ("WAN"), combination of LANs and WANs, the Internet, or any other type of communication network adapted for communicating electronic messages and information. Further, network(s) 110 may be implemented as a physical array of hardware resources or as a virtual array, or any combination thereof. Network(s) 110 may also be implemented in a cloud-based network configuration. For example, network(s) 110 may be implemented as public or private cloud network, or combination thereof. No specific network or network architecture should be construed as limiting the embodiments and techniques described in this disclosure.

Figure 4:
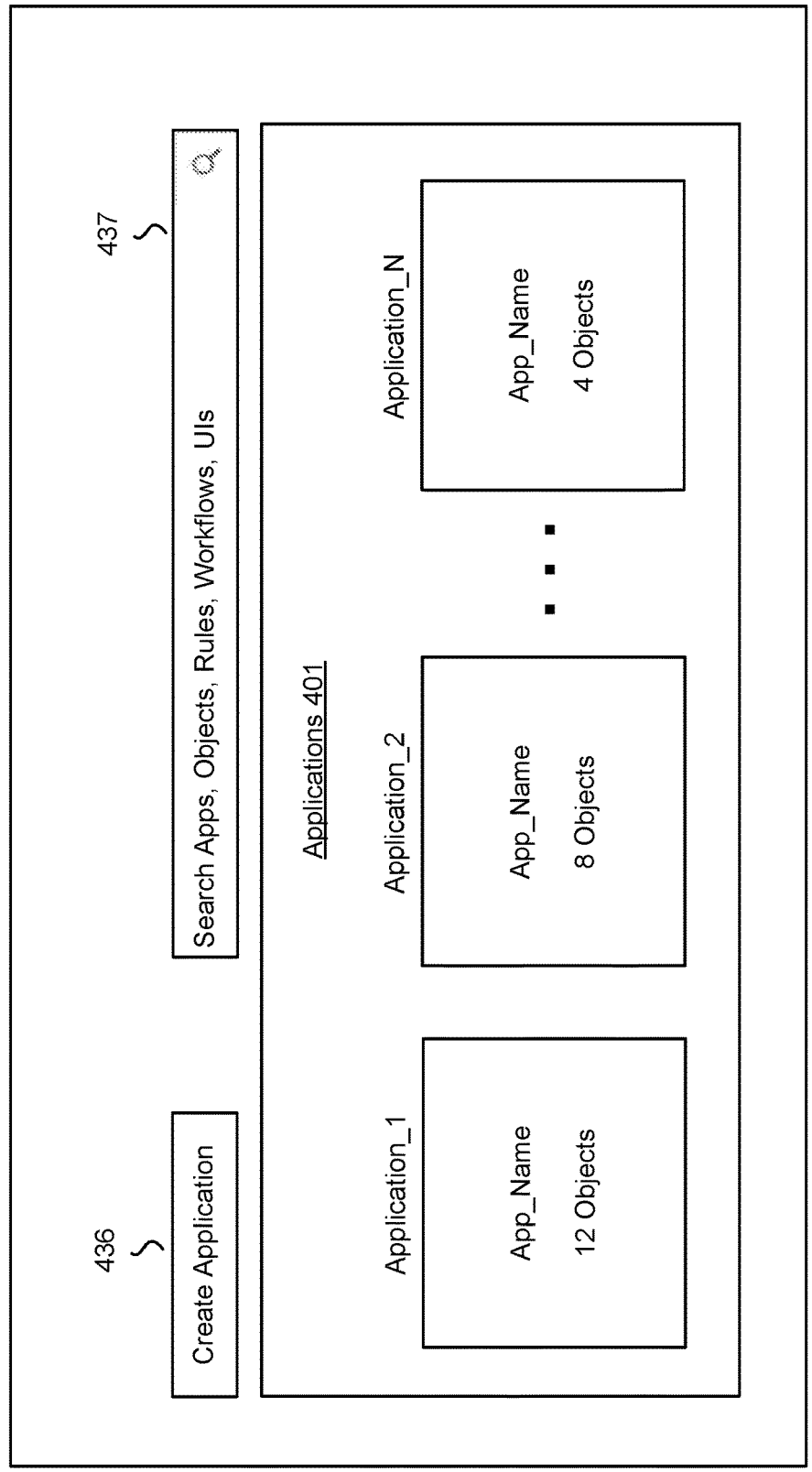
FIG. 4 depicts a conceptual block diagram of an example embodiment of a landing page in accordance with the techniques described in this disclosure.

FIG. 4 depicts a conceptual block diagram of an example embodiment of a landing page in accordance with the techniques described in this disclosure. The landing page 400 comprises a plurality of graphical elements for users to select to create and access applications 401 within the extendable data model framework. In the illustrated embodiment, landing page 400 includes a create application button 436 for users to select to create a new application to be build using the extendable data model framework. The landing page 400 further includes a search field 437 for users to enter search terms to search for applications, objects, or any other data structures accessible through the system. The landing page 40 further includes a listing of applications 401 (i.e., application_1, application_2, ... application_N) that may be presented to the user upon startup or after a search has been performed. Each of the applications may display an application name and a number of objects associated with the application.

Figure 5A:
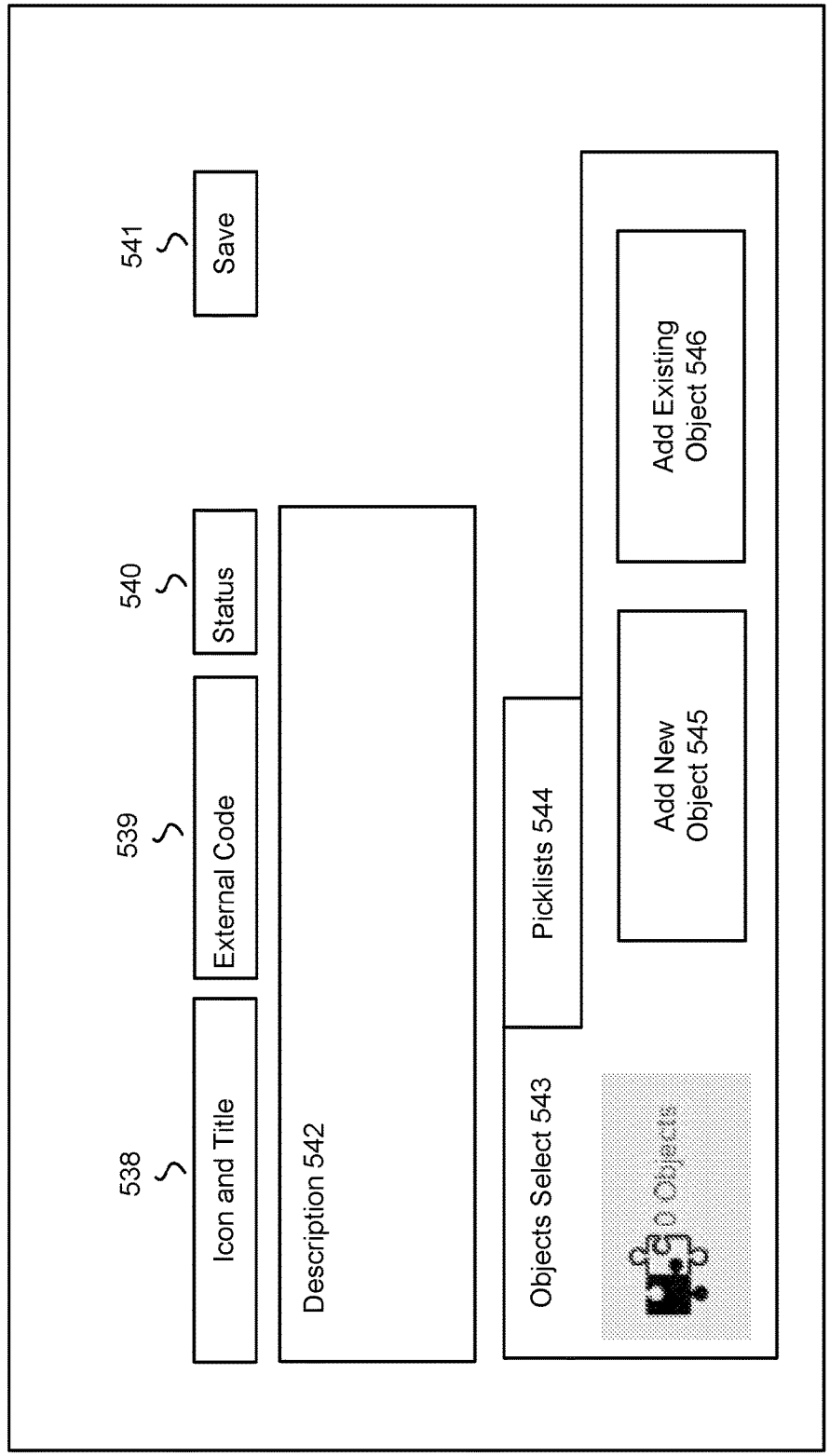
FIG. 5A depicts a conceptual block diagram of an example embodiment of a create application page in accordance with the techniques described in this disclosure.

FIG. 5A depicts a conceptual block diagram of an example embodiment of a create application page in accordance with the techniques described in this disclosure. In the illustrated embodiment, the create application page 500 includes a number of visual elements users can select to create a new application within the extendable data model framework. The depicted embodiment shows create application page 500 as including an icon and title selection tab 538, an external code selection tab, 539, a status tab 540, a save tab 541, and a description field 542 for users to enter a description of the application to be created. Other properties and selection tabs can be displayed and users can customize the fields and display elements to be included in the page 500. Create application page 500 further includes an objects select tab 543 and a picklists tab 544. The objects select tab 543 is shown as including selection tabs 545 for adding new objects and 546 for adding existing objects to the application under development.

Figure 5B:
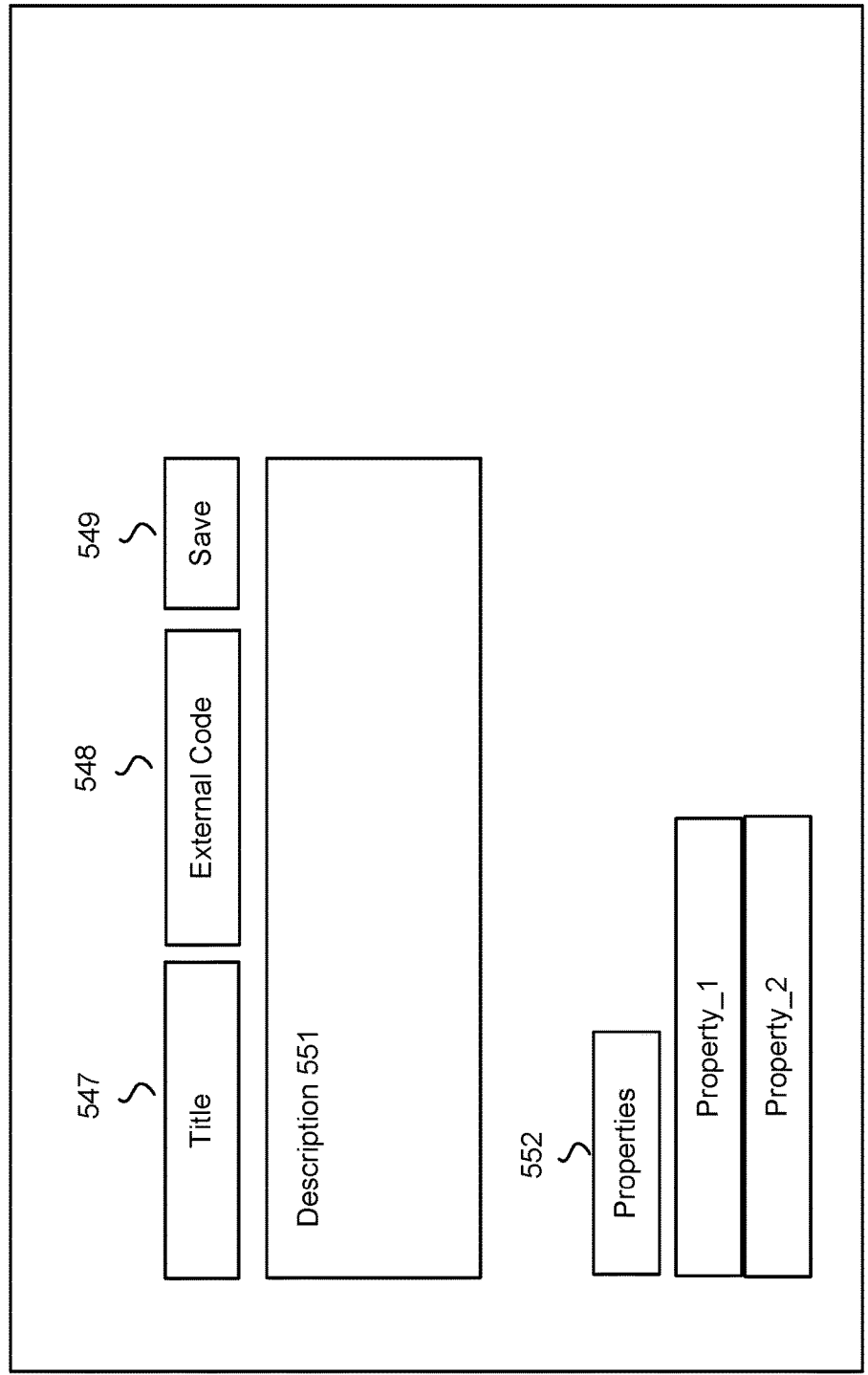
FIG. 5B depicts a conceptual block diagram of an example embodiment of a create object definition page in accordance with the techniques described in this disclosure.

FIG. 5B depicts a conceptual block diagram of an example embodiment of a create object definition page in accordance with the techniques described in this disclosure. In the figure, the create object definition page 501 includes a title field 547 for users to enter a title for an application under development, an external code field 548 for users to enter an external code corresponding to the application, a save tab, and a description field 551 for users to enter a description of the object details for the object to be created. The create object definition page 501 further includes a properties selection tab 552 and a listing of properties (e.g., Property_1, Property_2) for users to select and modify properties for the objects in the application to be developed.

Figure 5C:
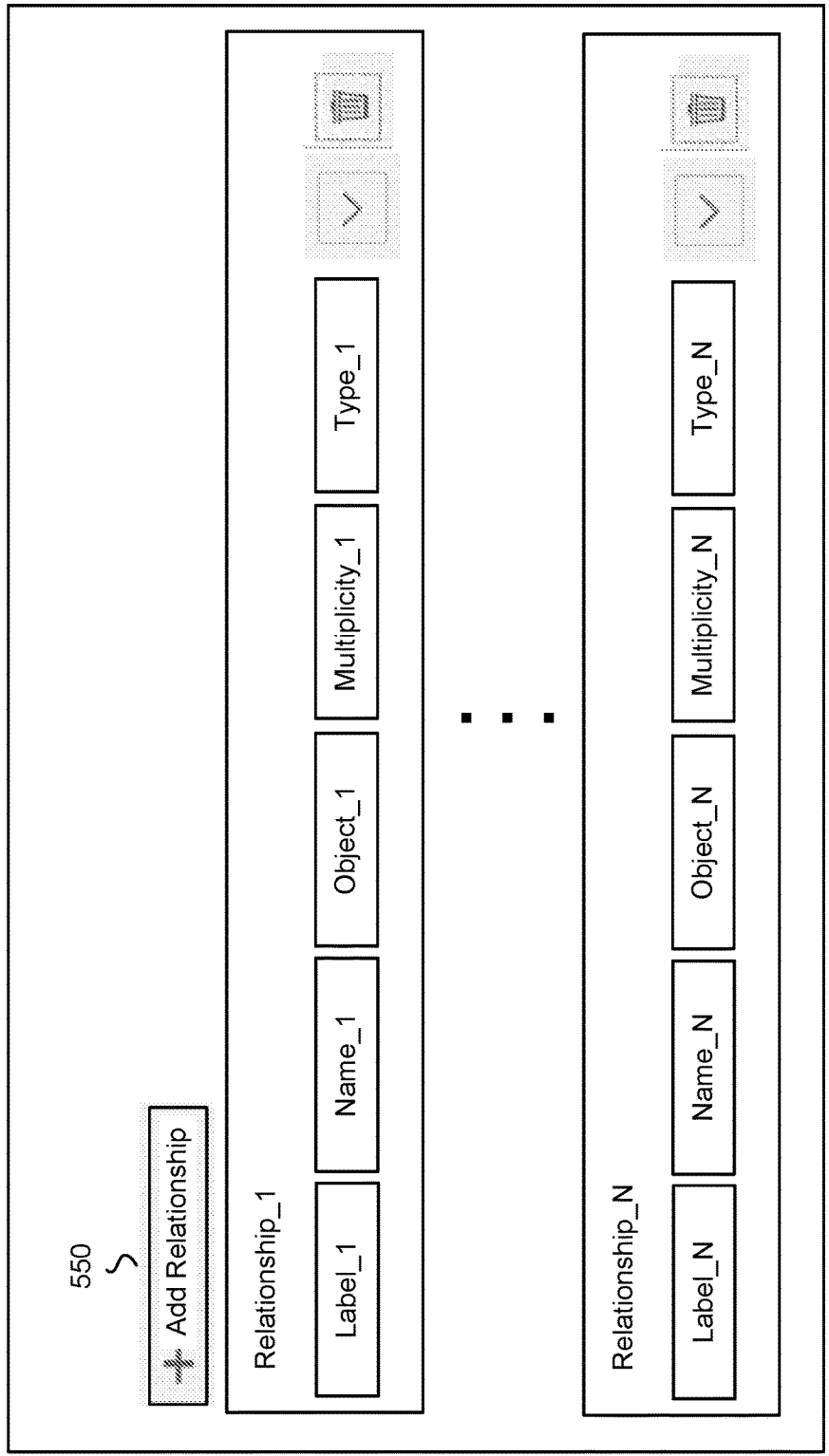
FIG. 5C depicts a conceptual block diagram of an example embodiment of a create object relationships page in accordance with the techniques described in this disclosure.

FIG. 5C depicts a conceptual block diagram of an example embodiment of a create object relationships page in accordance with the techniques described in this disclosure. In the illustrated embodiment, the create object relationships page 502 includes an add relationship selection tab 550 for adding new relationships among objects of applications being developed using the extendable data model framework in accordance with the techniques described in this disclosure. The create object relationships page 502 is currently displaying a first relationship (Relationship_1) and a second relationship (Relationship_N).

Each relationship may include multiple selection tabs for defining relationships among the data objects of applications being developed. In the illustrated example, Relationship_1 ... Relationship_N include a label field for the relationship, a name field for the relationship, an object field for the object that the relationship is being defined for, a multiplicity field, and a type field for users to include the type of relationship for the object. The create object relationships page 502 may further include more or fewer fields for defining and managing relationships of objects for the application.

Figure 5D:
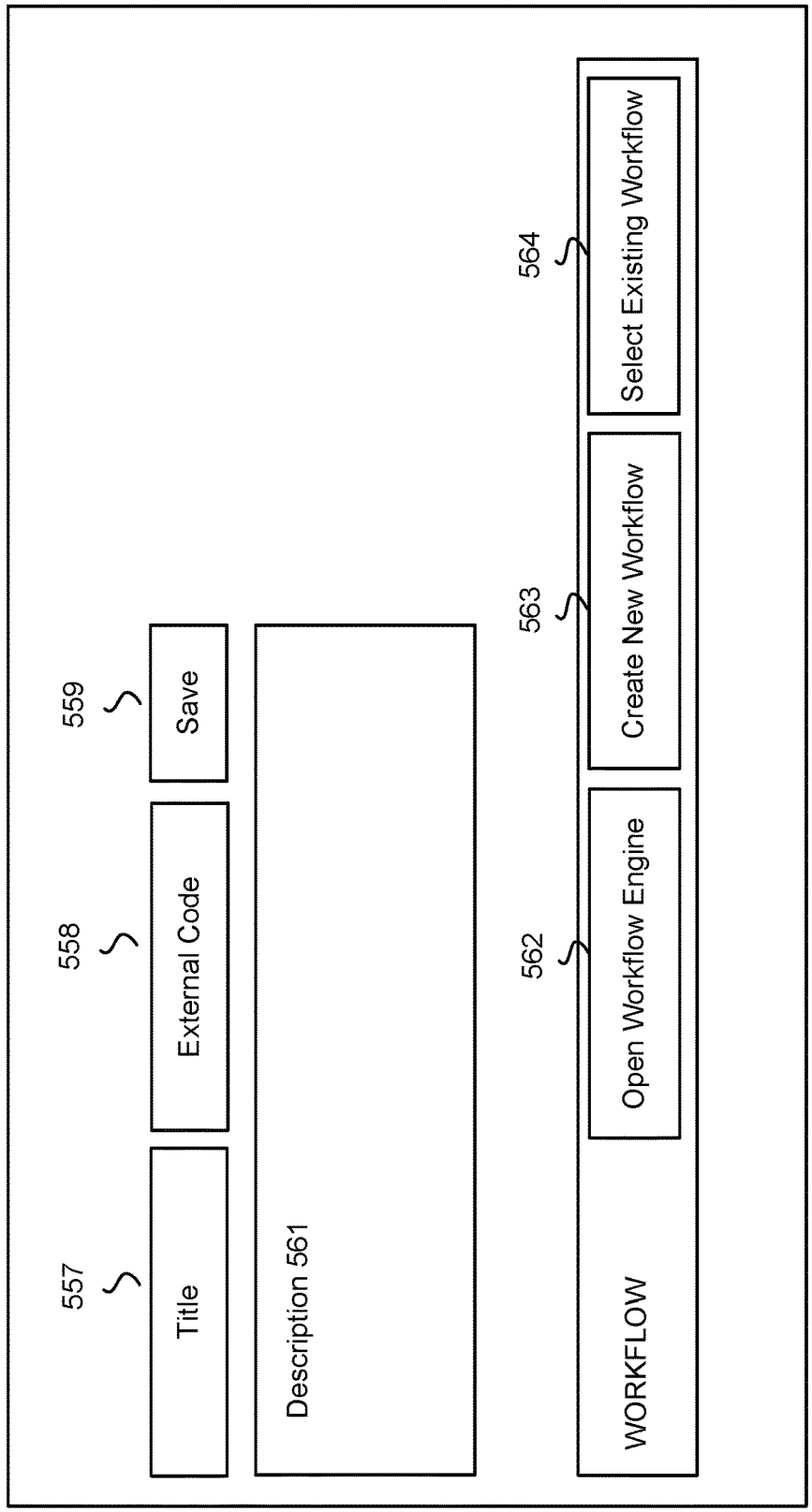
FIG. 5D depicts a conceptual block diagram of an example embodiment of a create workflow page in accordance with the techniques described in this disclosure.

FIG. 5D depicts a conceptual block diagram of an example embodiment of a create workflow page in accordance with the techniques described in this disclosure. In the illustrated embodiment, the create workflow page 503 includes a plurality of display elements for users to create workflows for the applications that are developed using the extendable data model framework. In this example, the create workflow page 503 includes a title field 557 for users to enter a title for the workflow, an external code field 558, a save tab 559 and a description field 561 for users to enter a description of the workflow. The create workflow page also includes an open workflow engine selection tab 562 for users to invoke the workflow engine, a create new workflow selection tab 563 for users to create new workflows, and a select existing workflow tab 564 for users to select and manage existing workflows for applications under development using the extendable data model framework.

Figure 6A:
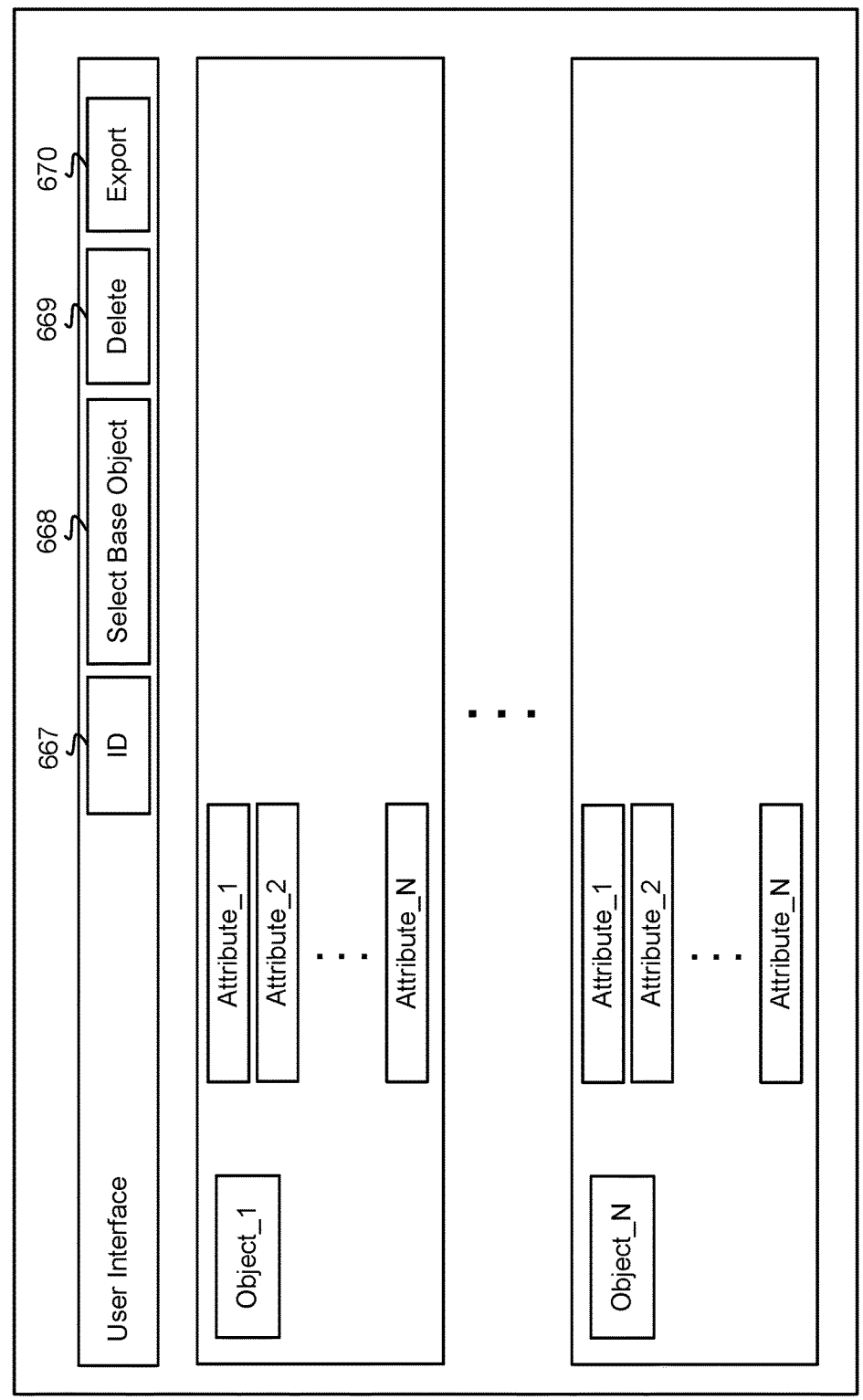
FIG. 6A depicts a conceptual block diagram of an example embodiment of a create user interface page in accordance with the techniques described in this disclosure.

FIG. 6A depicts a conceptual block diagram of an example embodiment of a create user interface page in accordance with the techniques described in this disclosure. The create user interface page 600 can be provided to users in the graphical display of the user interface to enable users to design graphical user interfaces for applications they develop using the extended data model framework. In the illustrated embodiment, the create user interface page 600 includes a user interface ID field 667 for identifying the user interface, a select base object tab 668 for users to select objects to add to the user interface, a delete selection tab 669 for users to delete elements within the user interface, and an export selection tab 670 to enable users to export user interface designs to other systems.

The create user interface page 600 also displays a number of objects for the user interface (Object_1 . . . Object_N). Each object may include a number of attributes (e.g., Attribute_1, Attribute_2, . . . , Attribute_N) to be presented in the user interface for applications under development using the extendable data model framework of the embodiments described in this disclosure.

Figure 6B:
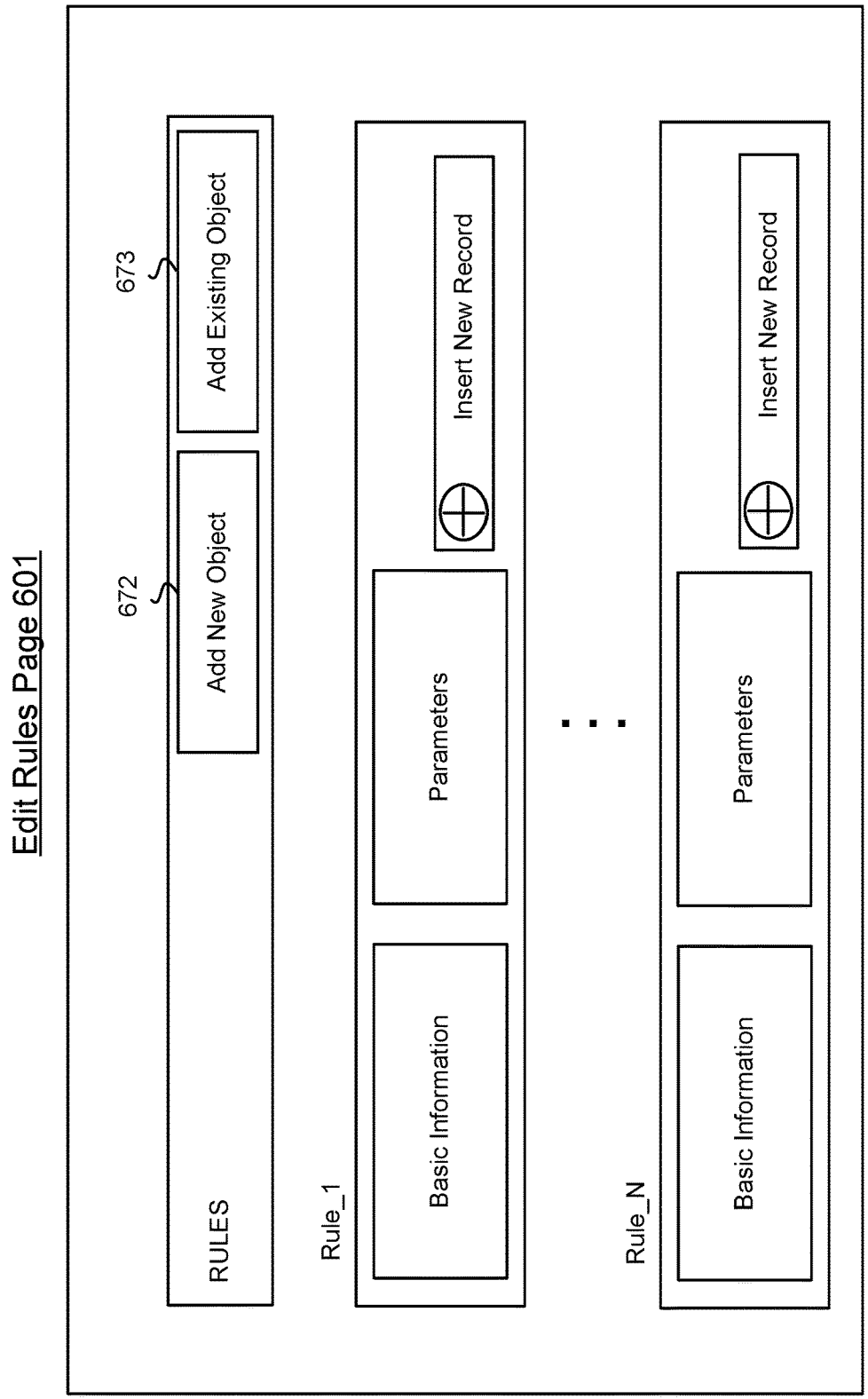
FIG. 6B depicts a conceptual block diagram of an example embodiment of a edit rules page in accordance with the techniques described in this disclosure.

FIG. 6B depicts a conceptual block diagram of an example embodiment of a edit rules page in accordance with the techniques described in this disclosure. The edit rules page 601 may allow users to create and manage rules for the objects of applications under development using the extendable data model framework. In the illustrated example, the edit rules page 601 includes an add new object selection tab 672 and an add existing object selection tab 673 for users to define new rules for new or existing objects within applications under development. The edit rules page 601 also displays a number of rules (Rule_1, . . . , Rule_N) for the objects of the application. As shown, each rule displayed in the edit rules page 601 may include basic information about the rule, parameters assigned to the rule, and may also provide a selection tab for adding new information or parameters.

Figure 6C:
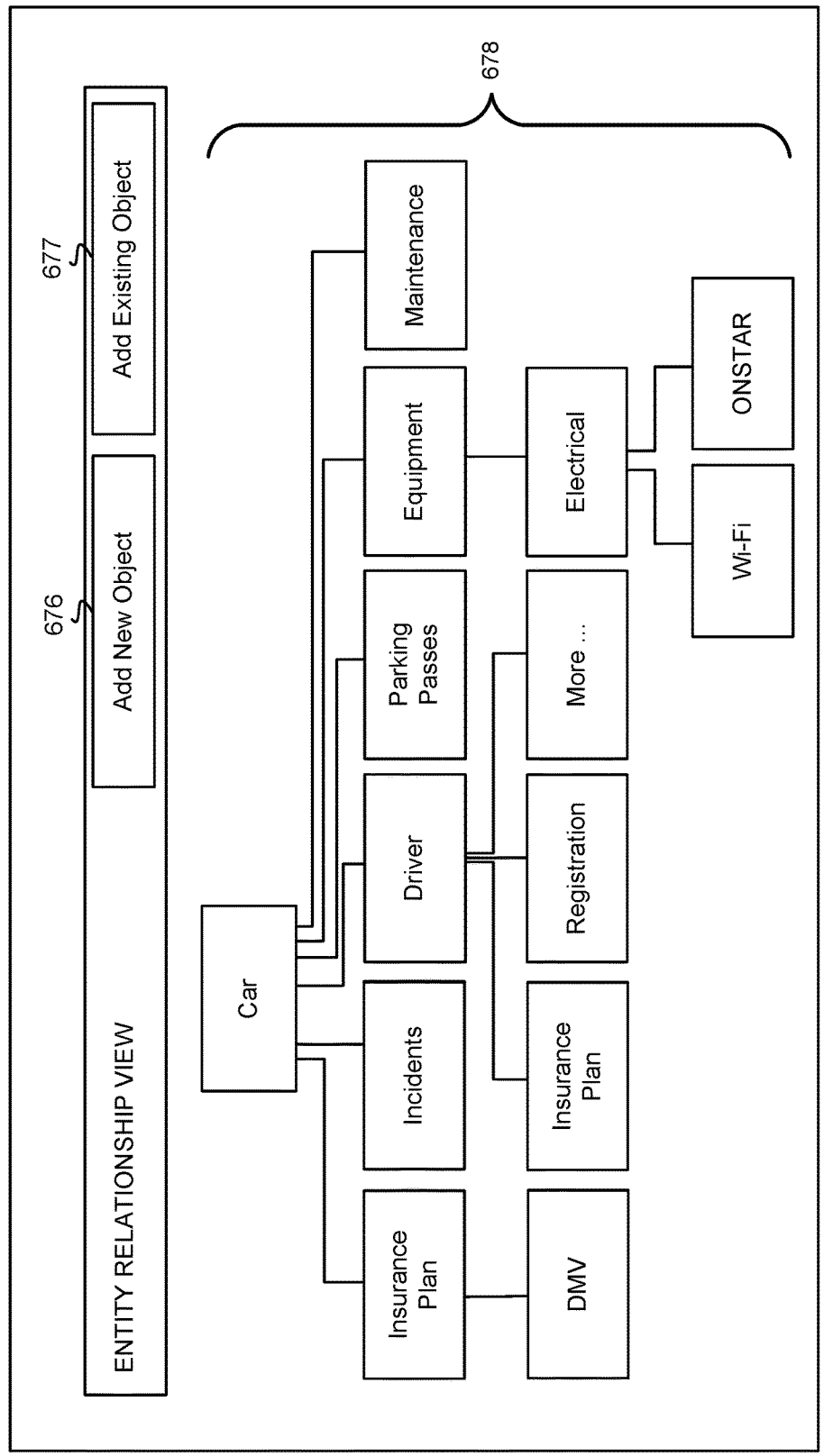
FIG. 6C depicts a conceptual block diagram of an example embodiment of a relationships view page in accordance with the techniques described in this disclosure.

FIG. 6C depicts a conceptual block diagram of an example embodiment of a relationships view page in accordance with the techniques described in this disclosure. The relationships view page 602 may provide users with an overview of the objects (or other entities) within applications under development using the extendable data model framework. In the illustrated example, the relationship view page 602 displays an entity relationship view for a car application showing the various data objects 678 for the application as well as the relationships between those objects. The relationships view page 602 also provides user-selectable tabs for adding new objects 676 or existing objects 677 to the entity relationship view.

II. Exemplary Processes

The following figures depict example flow charts illustrating various embodiments of a process for developing an application based on an extendable data model framework in accordance with the techniques described in this disclosure. It is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 7:
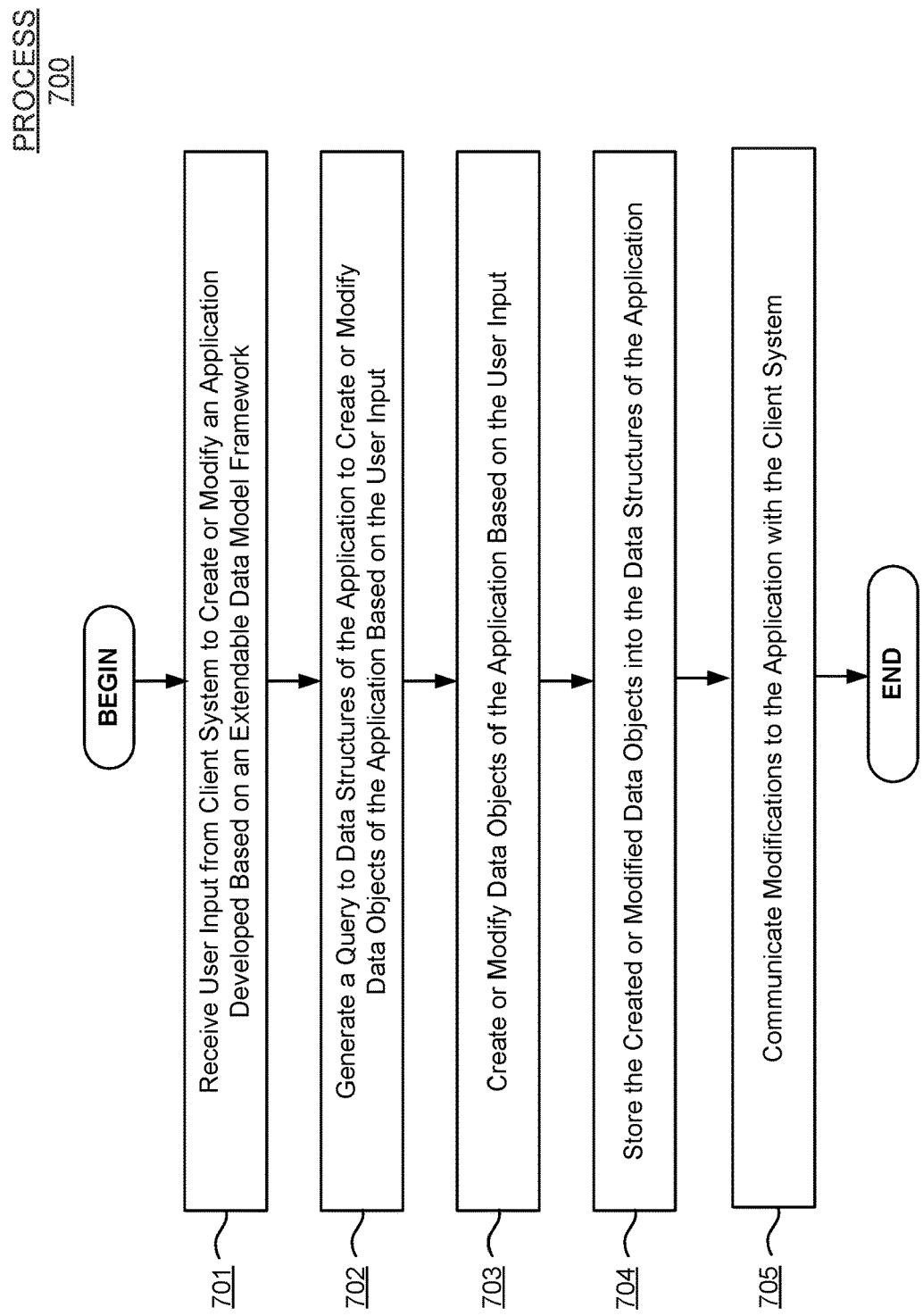
FIG. 7 depicts a flow chart of an example embodiment of a process for building an application based on the extendable data model framework in accordance with the techniques described in this disclosure.

FIG. 7 depicts a flow chart of an example embodiment for developing an application based on an extendable data model framework in accordance with the techniques described in this disclosure. In the illustrated embodiment, process 700 begins at operation 701 by receiving user input from a user interface of a client system in communication with the computer system over one or more networks. The user input may be configured to create or modify an application based on an extendable data model framework that enables users to develop applications in the user interface of the client system. In one embodiment, the extendable data model framework comprises an extendable data object data structure to store data objects of the application and an extendable data object relationships data structure to store relationships between the data objects of the application.

According to certain embodiments, users can develop and customize their applications in a graphical display at the client's system based on the extendable data model framework without writing a single line of code for the application. The backend system (e.g., server computer) can be configured to generate queries for the applications to be developed to modify the data model of the application based on the user inputs to the user interface. In response to the user input, process 700 continues by generating a query to the extendable data object data structure and/or the extendable data object relationships data structure associated with the application stored in memory of the computer system to retrieve one or more data objects of the application (operation 702).

Process 700 continues by creating or modifying the data objects (and/or relationships between the data objects) of the application based on the user input (operation 703), storing the created or modified data objects (and/or relationships between the data objects) of the application back into the appropriate data objects in the memory of the computer system (operation 704), and communicating modifications to the application with the client system over the network(s) (operation 705). In one embodiment, the queries can be generated dynamically at runtime in the backend system to perform the operations on the data objects of the application stored in the extendable data objects data structure and/or on the relationships between the objects stored in the extendable data objects relationships data structure.

Going back to the company car example, a new employee may be assigned a company car in the user interface at the client system based on the company car application developed using the extendable data model framework described in this disclosure. A query can then be generated in the backend system based on the user input to retrieve the appropriate data objects and relationships in response to the user input at the client system. For example, a query can be generated to retrieve data objects including the employee's records, available company cars, the company's workflows and policies regarding company cars, as well as the necessary managerial approvals for assigning a company car, etc. The backend system can then assign a company car to the employee and store the relationship between the employee and the company car into the extendable data objects relationships data structure in the memory of the system. The updates to the application can then be communicated back to the client and displayed in the user interface at the client system.

This completes process 700 in accordance with one example embodiment. In one embodiment, the extendable data model framework may include an extendable data object data structure and an extendable data object relationships data structure. The extendable data object data structure may include a set of common data objects in a first set of columns for storing a set of attributes associated with the set of common data objects and a second set of empty columns for users to supply additional attributes to the set of common data objects. Additional rows may also be provided for users to add new objects to the application under development. The extendable data object relationships data structure may include a set of relationships between the set of data objects, and may also include additional rows and columns for defining new relationships among data objects or defining additional relationships to existing data objects, etc.

In one embodiment, the user input may include user inputs for developing the user interface for the application in a create user interface page, user inputs for defining data objects for the application in a create data object page of the user interface, user inputs for creating relationships among data objects of the application in a create data object relationships page of the user interface, user inputs for editing rules for data objects of the application in a create rules page of the user interface, and/or user inputs for creating workflows for data objects of the application in a create workflow page of the user interface.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

FIG. 8 depicts an example overview block diagram of a data processing system upon which the embodiments described in this disclosure may be implemented. It is to be understood that a variety of computers configurations may be used to implement the described techniques. While FIG. 8 illustrates various components of a data processing system 800, it is not intended to represent any particular architecture or manner of interconnecting components. It will also be appreciated that network computers and other data processing systems, which have fewer components or additional components, may be used. The data processing system 800 may, for example, comprise a personal computer (PC), workstation, laptop computer, tablet, smartphone or other hand-held wireless device, or any device having similar functionality.

In the illustrated embodiment, data processing system 800 includes a computer system 810. Computer system 810 includes an interconnect bus 805 (or other communication mechanism for communicating information) and one or more processor(s) 801 coupled with the interconnect bus 805 for processing information. Computer system 810 also includes a memory system 802 coupled with the one or more processors 801 via the interconnect bus 805. Memory system 802 is configured to store information and instructions to be executed by processor 801, including information and instructions for performing the techniques described above. This memory system may also be used for storing programs executed by processor(s) 801. Possible implementations of this memory system may be, but are not limited to, random access memory (RAM), read only memory (ROM), or combination thereof.

In the illustrated embodiment, a storage device 803 is also provided for storing information and instructions. Typically storage device 803 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 803 may store source code, binary code, or software files for performing the techniques above. In addition, while FIG. 8 shows that storage device 803 as a local device connected with the components of the data processing system, it will be appreciated by skilled artisans that the described techniques may use a storage device remote from the system, such as a database or other network storage device coupled with the computer system 810 through a network interface such as network interface 804.

Network interface 804 may provide communications between computer system 810 and a network 820. The network interface 804 may be a wireless or wired connection, or any combination thereof. Computer system 810 is configured to send and receive information through the network interface 804 across one or more networks 820 such as a local area network (LAN), wide-area network (WAN), wireless or Bluetooth network, or the Internet 830, etc. Computer system 810 may access data and features on systems residing on one or multiple different hardware servers 831-834 across the network 820. Hardware servers 831-834 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 810 may be coupled via interconnect bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the techniques described in this disclosure. Other arrangements, embodiments, implementations and equivalents will be evident to those skilled in the art and may be employed without departing from the spirit and scope of the disclosure as defined by the following claims.

What is claimed is:

1. A method comprising:
in a server computer system comprising at least one processor and a memory in communication with the processor:
generating on the server computer system, during runtime of one or more applications, a data model tree comprising groupings of data objects from a first table, based on different data object relationships in a second table, wherein a first plurality of data objects in a first group are related for use in a first application and a second plurality of data objects in a second group are related for use in a second application;
receiving a first user input at the server computer system, from a user interface of a client computer system over one or more networks, the first user input comprising search terms for an application of the plurality of applications developed based on an extendable data model framework, the extendable data model framework being adapted to enable users to develop applications in the user interface of the client computer system,
wherein the extendable data model framework comprises the first table and the second table, where in the first table is an extendable data object data structure to store data objects of the application and the second table is an extendable data object relationships data structure to specify a plurality of different relationship types between the data objects of the application, wherein the second table comprises a first field specifying one of a plurality of source objects, a second field specifying one of a plurality of destination objects, and a third field specifying one of a plurality of relationship types;
in response to the first user input, automatically generating a query based on the generated data model tree to one or more of the extendable data object data structures and the extendable data object relationships data structures associated with the application stored in memory of the server computer system to retrieve one or more data objects and data object relationships of the application and providing a visual display of said data objects and data object relationships to said user interface;
receiving non-coding second user inputs according to user interactions with the visual displays of the data objects and data object relationships in order modify the application, wherein, in response to the second user inputs, the data objects and data object relationships of the application are created or modified;
generating the application from the created or modified data objects of the application and the data structures associated with the application stored memory of the server computer system; and
automatically communicating the application with modifications to the client computer system;
automatically displaying the application with the modifications in the user interface of the client computer system; and
refreshing the generated data model tree during runtime of the one or more applications based on the modifications.

2. The method of claim 1 wherein the extendable data object data structure includes a first set of rows of common data objects for the application, the first set of rows comprising a first set of columns for storing attributes of the common data objects and a second set of empty columns for users to supply additional attributes for the common data objects.

3. The method of claim 2 wherein the extendable data object data structure includes a second set of empty rows for users to define additional data objects for the application.

4. The method of claim 1 wherein the extendable data object relationships data structure includes a set of empty rows for defining additional relationships between the data objects of the application.

5. The method of claim 1 further comprising receiving third user inputs comprise inputs for developing the user interface for the application in a create user interface page.

6. The method of claim 1 further comprising receiving third user inputs comprise inputs for defining data objects for the application in a create data object page of the user interface.

7. The method of claim 1 further comprising receiving third user inputs comprise inputs for creating relationships among data objects of the application in a create data object relationships page of the user interface.

8. The method of claim 1 further comprising receiving third user inputs comprise inputs for editing rules for data objects of the application in a create rules page of the user interface.

9. The method of claim 1 further comprising receiving third user inputs comprise inputs for creating workflows for data objects of the application in a create workflow page of the user interface.

10. A system comprising:
at least one processor; and
a memory in communication with the processor via one or more communication mediums, wherein the memory stores programmed computer code, which when executed by the processor, causes the system to perform operations comprising:
generating on the server computer system, during runtime of one or more applications, a data model tree comprising groupings of data objects from a first table, based on different data object relationships in a second table, wherein a first plurality of data objects in a first group are related for use in a first application and a second plurality of data objects in a second group are related for use in a second application;
receiving a first user input at the server computer system, from a user interface of a client computer system over one or more networks, the first user input comprising search terms for an application of the plurality of applications developed based on an extendable data model framework, the extendable data model framework being adapted to enable users to develop applications in the user interface of the client computer system,
wherein the extendable data model framework comprises an extendable data object data structure to store data objects of the application and an extendable data object relationships data structure to store relationships between the data objects of the application,
wherein the extendable data object data structure is the table comprising:

a first set of rows of common data objects for the application;
a first set of columns for storing attributes of the common data objects; and
a second set of empty columns for users to supply additional attributes for the common data objects, and
wherein the extendable data object relationships data structure is the second table comprising a set of empty rows for defining additional relationships between the data objects of the application, wherein the second table comprises a first field specifying one of a plurality of source objects, a second field specifying one of a plurality of destination objects, and a third field specifying one of a plurality of relationship types,
in response to the first user input, automatically generating a query based on the generated data model tree to one or more of the extendable data object data structures and the extendable data object relationships data structures associated with the application stored in memory of the server computer system to retrieve one or more data objects and data object relationships of the application and providing a visual display of said data objects and data object relationships to said user interface;
receiving non-coding second user inputs according to user interactions with the visual displays of the data objects and data object relationships in order modify the application, wherein, in response to the second user inputs, the data objects and data object relationships of the application are created or modified;
generating the application from the created or modified data objects of the application and the data structures associated with the application stored in memory of the server computer system;
automatically communicating the application with modifications to the client computer system;
automatically displaying the application with the modifications in the user interface of the client computer system; and
refreshing the generated data model tree during runtime of the one or more applications based on the modifications.

11. The system of claim 10 further comprising a data objects engine for configuring data objects of the application.

12. The system of claim 10 further comprising a data objects relationships engine for configuring relationships between data objects of the application.

13. The system of claim 10 further comprising a workflow engine for configuring one or more workflows for data objects of the application.

14. The system of claim 10 further comprising a query generator for querying the extendable data objects data structure and the extendable data object relationships data structure based on the user input.

15. A non-transitory computer readable storage medium storing programmed computer code, which when executed by at least one processor, causes the processor to perform operations in a server computer system, the operations comprising:
generating on the server computer system, during runtime of one or more applications, a data model tree comprising groupings of data objects from a first table, based on different data object relationships in a second table, wherein a first plurality of data objects in a first group are related for use in a first application and a second plurality of data objects in a second group are related for use in a second application;
receiving a first user input at the server computer system, from a user interface of a client computer system over one or more networks, the first user input comprising search terms for an application of the plurality of applications developed based on an extendable data model framework, the extendable data model framework being adapted to enable users to develop applications in the user interface of the client computer system,
wherein the extendable data model framework comprises the first table and the second table, where in the first table is an extendable data object data structure to store data objects of the application and the second table is an extendable data object relationships data structure to specify a plurality of different relationship types between the data objects of the application, wherein the second table comprises a first field specifying one of a plurality of source objects, a second field specifying one of a plurality of destination objects, and a third field specifying one of a plurality of relationship types;
in response to the first user input, automatically generating a query based on the generated data model tree to one or more of the extendable data object data structures and the extendable data object relationships data structures associated with the application stored in memory of the server computer system to retrieve one or more data objects and data object relationships of the application and providing a visual display of said data objects and data object relationships to said user interface;
receiving non-coding second user inputs according to user interactions with the visual displays of the data objects and data object relationships in order modify the application, wherein, in response to the second user inputs, the data objects and data object relationships of the application are created or modified;
generating the application from the created or modified data objects of the application and the data structures associated with the application stored in memory of the server computer system;
automatically communicating the application with modifications to the client computer system;
automatically displaying the application with the modifications in the user interface of the client computer system; and
refreshing the generated data model tree during runtime of the one or more applications based on the modifications.

16. The computer readable storage medium of claim 15 wherein the extendable data object data structure includes a first set rows of common data objects for the application, the first set of rows comprising a first set of columns for storing attributes of the common data objects and a second set of empty columns for users to supply additional attributes for the common data objects.

17. The computer readable storage medium of claim 16 wherein the extendable data object data structure includes a second set empty rows for users to define additional data objects for the application, and the extendable data object relationships data structure includes a set of empty rows for defining additional relationships between the data objects of the application.

* * * * *